(12) United States Patent
Wang

(10) Patent No.: US 12,063,678 B2
(45) Date of Patent: Aug. 13, 2024

(54) INFORMATION SENDING METHOD, USER TERMINAL AND COMPUTER-READABLE STORAGE MEDIUM

(71) Applicant: BEIJING UNISOC COMMUNICATIONS TECHNOLOGY CO., LTD., Beijing (CN)

(72) Inventor: Hualei Wang, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 357 days.

(21) Appl. No.: 17/600,026

(22) PCT Filed: Mar. 11, 2020

(86) PCT No.: PCT/CN2020/078816
§ 371 (c)(1),
(2) Date: Sep. 29, 2021

(87) PCT Pub. No.: WO2020/199877
PCT Pub. Date: Oct. 8, 2020

(65) Prior Publication Data
US 2022/0191883 A1    Jun. 16, 2022

(30) Foreign Application Priority Data
Mar. 29, 2019 (CN) .................. 201910247923.X

(51) Int. Cl.
*H04W 72/56* (2023.01)
*H04L 1/1812* (2023.01)
(Continued)

(52) U.S. Cl.
CPC .......... *H04W 72/56* (2023.01); *H04L 1/1812* (2013.01); *H04L 5/0053* (2013.01);
(Continued)

(58) Field of Classification Search
CPC . H04W 72/56; H04W 72/0453; H04W 72/21; H04W 72/542; H04L 1/1812; H04L 5/0053
See application file for complete search history.

(56) References Cited

U.S. PATENT DOCUMENTS

| 4,819,229 A | 4/1989 | Pritty et al. |
| 11,647,482 B2 * | 5/2023 | Chen ............ H04W 72/53 370/330 |

(Continued)

FOREIGN PATENT DOCUMENTS

| CN | 102013954 A | 4/2011 |
| CN | 102595476 A | 7/2012 |

(Continued)

OTHER PUBLICATIONS

First Examination Report regarding Indian Patent Application No. 202117048936, dated Mar. 29, 2022.

(Continued)

*Primary Examiner* — Brenda H Pham
(74) *Attorney, Agent, or Firm* — Harness, Dickey & Pierce, P.L.C.

(57) ABSTRACT

An information sending method, a user terminal and a computer-readable storage medium are provided. The method comprises: determining whether physical channels in target information exist channel collision, in response to detecting an instruction for sending target information; determining a priority corresponding to each physical channel in the target information, in response to existing channel collision in the target information; processing the target (Continued)

information based on the priority of each physical channel in the target information, wherein said processing the target information comprises: multiplexing information carried by a physical channel with a lower priority in the target information to a physical channel with a higher priority in the target information; or, discarding the information carried by a physical channel with a low priority in the target information; and sending processed target information.

18 Claims, 2 Drawing Sheets

(51) Int. Cl.
    *H04L 5/00*           (2006.01)
    *H04W 72/0453*     (2023.01)
    *H04W 72/21*        (2023.01)
    *H04W 72/542*      (2023.01)

(52) U.S. Cl.
    CPC ....... *H04W 72/0453* (2013.01); *H04W 72/21* (2023.01); *H04W 72/542* (2023.01)

(56) References Cited

U.S. PATENT DOCUMENTS

| | | | |
|---|---|---|---|
| 2002/0136233 A1* | 9/2002 | Chen | H04W 72/1215 370/445 |
| 2011/0242982 A1 | 10/2011 | Lunttila et al. | |
| 2012/0140708 A1 | 6/2012 | Choudhury et al. | |
| 2012/0314613 A1 | 12/2012 | Zhang et al. | |
| 2015/0110029 A1 | 4/2015 | Hwang et al. | |
| 2016/0143014 A1 | 5/2016 | Mukherjee et al. | |
| 2016/0242172 A1 | 8/2016 | Lunttila et al. | |
| 2018/0368175 A1* | 12/2018 | Jeon | H04W 72/04 |
| 2018/0375619 A1* | 12/2018 | Hwang | H04L 1/1854 |
| 2019/0045484 A1 | 2/2019 | Liu et al. | |

FOREIGN PATENT DOCUMENTS

| | | |
|---|---|---|
| CN | 105721128 A | 6/2016 |
| CN | 111182626 A | 5/2020 |
| GB | 2187917 A | 9/1987 |
| WO | WO-2012077480 A1 | 6/2012 |
| WO | WO-2017132845 A1 | 8/2017 |
| WO | WO-2020-199877 A1 | 10/2020 |

OTHER PUBLICATIONS

Extended European Search Report mailed Dec. 8, 2022, in corresponding European Application No. 20783139.7.
LG Electronics: "Remaining issues on collision handling between different TTI lengths", 3GPP Draft; R1-1719855 Collision Handling V1, vol. Ran WG1, No. Reno, US; Nov. 27, 2017-Dec. 1, 2017 Nov. 18, 2017 (Nov. 18, 2017), XP051369569, Retrieved from the Internet: URL:http://www.3gpp.org/ftp/tsg%5Fran/WG1 %5FRL1 /TSGR1 %5F91/ Docs/ [retrieved on Nov. 18, 2017].
Sony: "Considerations on intra-UE transmission multiplexing & prioritisation", 3GPP Draft; R1-1900376—REL-16 URLLC—Intra-UE UL MUX V07, vol. RAN WG1, No. Taipei, Taiwan; Jan. 21, 2019-Jan. 25, 2019 Jan. 20, 2019 (Jan. 20, 2019), XP051593290, Retrieved from the Internet: URL:http://www.3gpp.org/ftp/Meetings%5F3GPP%5FSYNC/RAN1/Docs/ R1 %2D1900376%2Ezip [retrieved on Jan. 20, 2019].
Vivo: "UL intra UE Tx prioritization for URLLC", 3GPP Draft; R1-1901698 UL Intra UE Tx Prioritization for URLLC, vol. RAN WG1, No. Athens, Greece; Feb. 25, 2019-Mar. 1, 2019 Feb. 16, 2019 (Feb. 16, 2019), XP051599394, Retrieved from the Internet: U RL:http://www.3gpp.org/ftp/tsg%5Fran/WG 1 %5FRL1 /TSG R1 %5F96/Docs/R1 %2D 1901698%2Ezip [retrieved on Feb. 16, 2019].
CATT. "Remaining details of UCI multiplexing on PUSCH" 3GPP TSG RAN WG1 Meeting #92. R1-1801733 Athens, Greece, Feb. 26-Mar. 2, 2018 (Mar. 2, 2018), (5 pages).
International Search Report (English and Chinese) and Written Opinion (Chinese) of the International Searching Authority issued in PCT/CN2020/078816, mailed May 26, 2020; ISA/CN (8 pages).

* cited by examiner

INFORMATION SENDING METHOD, USER TERMINAL AND COMPUTER-READABLE STORAGE MEDIUM

CROSS-REFERENCE TO RELATED APPLICATIONS

This application is the national phase of International Application No. PCT/CN2020/078816, filed on Mar. 11, 2020, which claims priority to Chinese Patent Application No. 201910247923.X, filed on Mar. 29, 2019, the entire disclosure of which is incorporated herein by reference.

TECHNICAL FIELD

The present disclosure generally relates to wireless communication technology field, and more particularly, to an information sending method, user terminal and computer-readable storage medium.

BACKGROUND

Under single transmission reception point and single carrier, the New Radio (NR) R15 formulates a plurality of uplink physical channels or priority criteria for confliction handling of signal. On each symbol, only one physical channel or one signal transmission is supported.

The R16 supports multiple Transmission Reception Point (multi-TRP) transmission, that is, there are a plurality of transmission points communicate with a user terminal. However, in the R16, no specific solution is given on the basis that physical channels of a plurality of communication links conflict.

SUMMARY

According to embodiments in the present disclosure, a method is provided when a collision occurs in physical channels of a plurality of communication links.

In an embodiment of the present disclosure, a method for sending information is provided, including: determining whether physical channels in target information exist channels collision, in response to detecting an instruction for sending target information; determining a priority corresponding to each physical channel in the target information, in response to existing channel collision in the target information; [[and]] processing the target information based on the priority of each physical channel in the target information, wherein said processing the target information includes: multiplexing information carried by a physical channel having a lower priority in the target information to a physical channel having a higher priority in the target information; or, discarding the information carried by the physical channel having the low priority in the target information; and sending processed target information.

In an embodiment of the present disclosure, a non-transitory computer-readable storage medium storing one or more programs, the one or more programs comprising computer instructions, which, when executed by a processor, cause the processor to: determining whether physical channels in target information exist channel collision, in response to detecting an instruction for sending target information; determining a priority corresponding to each physical channel in the target information, in response to existing channel collision in the target information; processing the target information based on the priority of each physical channel in the target information, wherein said processing the target information comprises: multiplexing information carried by a physical channel with a lower priority in the target information to a physical channel with a higher priority in the target information; or, discarding the information carried by a physical channel with a low priority in the target information; and sending processed target information. In an embodiment of the present disclosure, a user terminal comprising a memory and a processor is provided, the memory has computer instructions stored therein, when the processor executes the computer instructions, cause the processor to: determining whether physical channels in target information exist channel collision, in response to detecting an instruction for sending target information; determining a priority corresponding to each physical channel in the target information, in response to existing channel collision in the target information; processing the target information based on the priority of each physical channel in the target information, wherein said processing the target information comprises: multiplexing information carried by a physical channel with a lower priority in the target information to a physical channel with a higher priority in the target information; or, discarding the information carried by a physical channel with a low priority in the target information; and sending processed target information.

DETAILED DESCRIPTION

As described in background, there is a need for a method when physical channels of a plurality of communication links conflict in R16.

In embodiments of the present disclosure, when physical channels in the target information exist channel collision, multiplexing information carried by a physical channel with a lower priority in the target information to a physical channel with a higher priority in the target information; or, discarding the information carried by the physical channel with the low priority in the target information based on the priority of each physical channel in the target channel, so that if a plurality of physical channels exist channel collision, the conflicting physical channels can be processed accordingly, and the performance of the communication system can be improved.

In order to clarify the object, characteristic and advantages of embodiments of the present disclosure, embodiments of the present disclosure will be described clearly in detail in conjunction with accompanying drawings.

Figure 1:
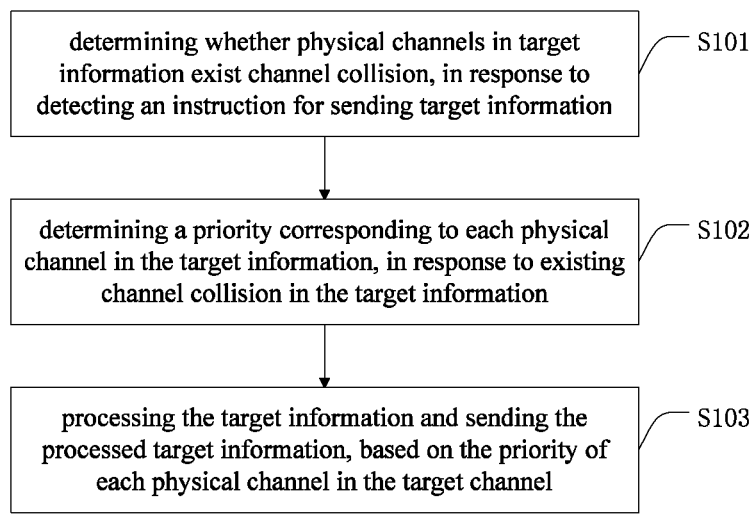
FIG. 1 schematically illustrates a process diagram of a method for sending information according to an embodiment of the present disclosure.

In an embodiment of the present disclosure, a method for sending information is provided, with reference to FIG. 1, the method is described below in detail in S101, S102, S103, and S104.

In S101, a UE determines whether physical channels in target information exist channel collision, in response to that the UE detects an instruction for sending target information.

In some embodiment, instruction information is sent to a user terminal by a base station to instruct the user terminal to send target information. The user terminal can be instructed implicitly by the base station to send the target information, or the user terminal can be instructed explicitly by the base station to send the target information. In practical applications, a user terminal is instructed to send target information by a base station through information such as Downlink Control Information (DCI).

After receiving instruction information sent by a base station, a requirement of sending target information to the base station is received by the user terminal.

In embodiments of the present disclosure, target information includes a plurality of physical channels. When a user terminal detects an instruction for sending the target information, and the target information needs to be sent at the same time, information in the target information may exist collision. Therefore, in embodiments of the present invention, a UE can determine whether physical channels in the target information exist channel collision first, if the physical channels exist channel collision, the UE can execute S102.

In embodiments of the present disclosure, when a UE detects that at least two physical channels overlap on a same symbol in target information, the UE can determines that there are channel collision of physical channels in the target information.

In S102, a UE determines a priority corresponding to each physical channel in the target information, in response to existing channel collision in the target information.

In some embodiment, when there is a channel collision of physical channels in the target information, the UE can determine a priority corresponding to each physical channel in the target information.

In embodiments of the present disclosure, a UE can determine a priority corresponding to each physical channel in the target information based on channel types and information carried by physical channels. The channel types carried by physical channels may include one of Physical Uplink Shared Channels (PUSCH) and Physical Uplink Control Channels (PUCCH).

In some embodiment, when physical channels in a target information include a PUSCH and a PUCCH, one of the following ways can be used to determine a priority corresponding to each physical channel in the target information by a UE:

If the PUCCH carries HARQ-ACK information, and the PUSCH carries CSI information and does not carry HARQ-ACK information, a UE can determine a priority of the PUCCH carrying HARQ-ACK information is higher than a priority of the PUSCH carrying CSI information but not carrying HARQ-ACK information.

If the PUCCH carries HARQ-ACK information, and the PUSCH does not carry CSI information or HARQ-ACK information, a UE can determine a priority of the PUCCH carrying HARQ-ACK information is higher than a priority of the PUSCH carrying neither CSI information nor HARQ-ACK information.

If the PUSCH carries HARQ-ACK information, a UE can determine a priority of the PUSCH carrying HARQ-ACK information is higher than a priority of the PUCCH carrying any information. That is, in the target information, as long as the PUSCH carries HARQ-ACK information, the PUSCH at this time has a highest priority.

That is, when physical channels in target information include a PUSCH and a PUCCH, a UE can use any one or more of the above methods to determine a priority of the PUSCH and a priority of the PUCCH which carry different information.

In other words, when physical channels in target information include a PUSCH and a PUCCH, a UE can use one of the above methods to determine the priority of the PUSCH and the PUCCH which carry different information, or a UE can use two or more of the above methods to determine a priority of the PUSCH and a priority of the PUCCH which carry different information.

In embodiments of the present invention, CSI information carried by a PUSCH may include at least one of the following: periodic CSI information, semi-persistent CSI information, and a non-periodic CSI report. When CSI information carried by the PUSCH is a non-periodic CSI report, a time interval between triggering a PUCCH with the non-periodic CSI report and carrying a PUSCH with the non-periodic CSI report is greater than a preset time threshold. In some embodiment, a preset time threshold may be a specified value in an existing communication protocol.

In some embodiment, when a physical channel in a target information include PUCCHs, a UE can use one of the following ways to determine a priority corresponding to each physical channel in the target information:

A UE can determine a priority of a PUCCH carrying HARQ-ACK information is higher than a priority of a PUCCH carrying CSI information but not carrying HARQ-ACK information; and a priority of a PUCCH carrying CSI information and HARQ-ACK information is higher than a priority of a PUCCH carrying HARQ-ACK information only.

In other words, when physical channels in target information include PUCCHs carrying different information, a UE can use one of the above methods to determine the priority corresponding to each physical channel.

In some embodiment, information carried by each physical channel in a target information may be the same, but corresponding to different resource types. Therefore, when a UE determines a priority corresponding to each physical channel in the target information, the UE can determine a priority corresponding to each physical channel in the target information according to resource types corresponding to the physical channels.

In embodiments of the present disclosure, a UE can determine a priority of a public PUCCH is determined higher than a priority of a non-public PUCCH.

In some embodiment, when a UE determines a priority corresponding to each physical channel in the target information, the UE can determine the priority corresponding to each physical channel in the target information according to cell indexes corresponding to the physical channels.

In embodiments of the present disclosure, a UE can determine a priority of a public PUCCH with a minimum cell index is higher than a priority of a public PUCCH with a high cell index; and a priority of a non-public PUCCH with a minimum cell index is higher than a priority of a non-public PUCCH with a high cell index.

In other words, when physical channels in target information include PUCCHs carrying different information, a UE can use one of the above methods to determine priorities of PUCCHs carrying different information, or a UE can use two or more of the above methods to determine priorities of PUCCHs carries different information.

In S103, a UE processes the target information based on the priority of each physical channel in the target information.

In some embodiment, after determining a priority of each physical channel in the target information, the target information can be processed by a UE.

In embodiments of the present disclosure, the UE processes the target information includes multiplexing information carried by a physical channel with a lower priority in the target information to a physical channel with a higher priority in the target information; or, discarding the information carried by the physical channel with the low priority in the target information.

In embodiments of the present disclosure, when a UE determines the priority of a PUCCH carrying HARQ-ACK information is higher than the priority of a PUSCH carrying CSI information but not carrying HARQ-ACK information, the UE can multiplex the CSI information carried by the PUSCH to the PUCCH carrying the HARQ-ACK information; or the UE can discard the PUSCH carrying CSI information but not carrying HARQ-ACK information.

When a UE determines the priority of a PUCCH carrying HARQ-ACK information is higher than the priority of a PUSCH carrying neither CSI information nor HARQ-ACK information, the UE can discard the PUSCH carrying neither CSI information nor HARQ-ACK information.

When a UE determines the priority of a PUSCH carrying HARQ-ACK information is higher than the priority of a PUCCH carrying any information, the UE can discard the PUCCH carrying arbitrary information; or the UE can multiplex the CSI information carried by the PUCCH to the PUSCH carrying the HARQ-ACK information.

When a UE determines the priority of a PUCCH carrying HARQ-ACK information is higher than the priority of a PUCCH carrying CSI information but not carrying HARQ-ACK information, the UE can discard the PUCCH carrying the CSI information but not carrying the HARQ-ACK information; or the UE can multiplex the CSI information carried by the PUCCH carrying the CSI information but not carrying the HARQ-ACK information to the PUCCH carrying the HARQ-ACK information.

When a UE determines the priority of a PUCCH carrying CSI information and HARQ-ACK information is higher than the priority of a PUCCH carrying HARQ-ACK information only, the UE can discard the PUCCH carrying the HARQ-ACK information only.

When a UE determines the priority of a public PUCCH is higher than the priority of a non-public PUCCH, the UE can discard the non-public PUCCH; or the UE can multiplex the information carried by the non-public PUCCH to the public PUCCH.

When a UE determines the priority of a public PUCCH with the minimum cell index is higher than the priority of a public PUCCH with a high cell index, the UE can discard the public PUCCH with the high cell index; or the UE can multiplex the information carried by the public PUCCH with the high cell index to the public PUCCH with the minimum cell index.

When a UE determines the priority of a non-public PUCCH with the minimum cell index is higher than the priority of a non-public PUCCH with the high cell index, the UE can discard the non-public PUCCH with the high cell index; or the UE can multiplex the information carried by the non-public PUCCH with the high cell index to the non-public PUCCH with the minimum cell index.

In S104, a UE sends processed target information.

In some embodiment, a UE can send the processed target information to a network side.

According to embodiments of the present disclosure, when physical channels in the target information exist channel collision, based on the priority of each physical channel in the target channel, a UE can multiplex information carried by a physical channel with a low priority in the target information to a physical channel with a high priority in the target information, or a UE can discard the information carried by a physical channel with a low priority in the target information, so that if a plurality of physical channels exist channel collision, a UE can process the collision physical channels accordingly, and the performance of the communication system can be improved.

Figure 2:
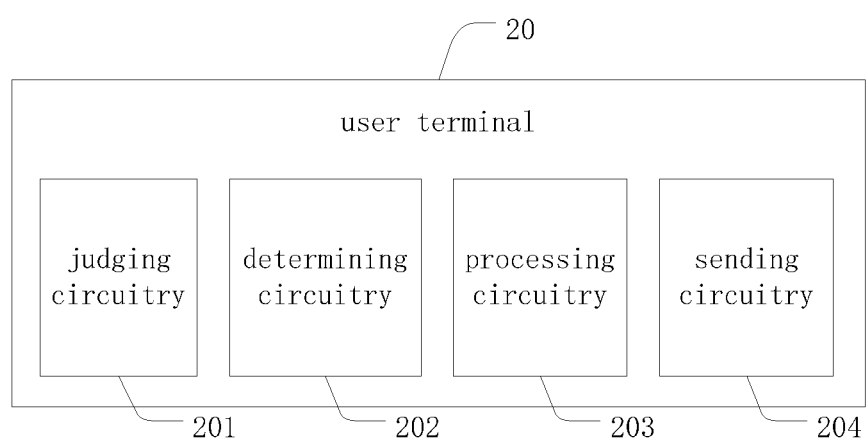
FIG. 2 schematically illustrates a structural diagram of a user terminal according to an embodiment of the present disclosure.

Referring to FIG. 2, in an embodiment of the present disclosure, a user terminal 20 is provided, including: a judging circuitry 201, a determining circuitry 202, a processing circuitry 203 and a sending circuitry 204, wherein:

The judging circuitry 201 is adapted to determine whether physical channels in target information exist channel collision, if an instruction for sending target information is detected.

The determining circuitry 202 is adapted to determine a priority corresponding to each physical channel in the target information, if existing channel collision in the target information.

The processing circuitry 203 is adapted to process the target information, based on the priority of each physical channel in the target information, includes: multiplexing information carried by a physical channel with a lower priority in the target information to a physical channel with a higher priority in the target information; or, discarding the information carried by the physical channel with the low priority in the target information.

The sending circuitry 204 is adapted to send processed target information.

In some embodiment, the judging circuitry 201 can be adapted to determine physical channels in the target information exist channel collision, if at least two physical channels overlap on the same symbol in the target information.

In some embodiment, the determining circuitry 202 is adapted to determine the priority corresponding to each physical channel in the target information according to channel types and information carried by physical channels.

In some embodiment, the determining circuitry 202 is adapted to perform at least one of the following: determining a priority of a PUCCH carrying HARQ-ACK information is higher than a priority of a PUSCH carrying CSI information but not carrying HARQ-ACK information; determining a priority of a PUCCH carrying HARQ-ACK information is higher than a priority of a PUSCH carrying neither CSI information nor HARQ-ACK information; and determining a priority of a PUSCH carrying HARQ-ACK information is higher than a priority of a PUCCH carrying arbitrary information.

In some embodiment, the CSI information carried by the PUSCH includes at least one of the following: periodic CSI information, semi-persistent CSI information, and a non-periodic CSI report.

In some embodiment, if the CSI information carried by the PUSCH is the non-periodic CSI report, a time interval between a time point of triggering a PUCCH with the non-periodic CSI report and a time point of carrying a PUSCH with the non-periodic CSI report is greater than a preset time threshold.

In some embodiment, the processing circuitry 203 is adapted to multiplex the CSI information carried by the PUSCH to the PUCCH carrying the HARQ-ACK information; or discard the PUSCH carrying CSI information but not carrying HARQ-ACK information, if the determining circuitry determines the priority of a PUCCH carrying HARQ-ACK information is higher than the priority of a PUSCH carrying CSI information but not carrying HARQ-ACK information.

In some embodiment, the processing circuitry 203 is adapted to discard the PUSCH carrying neither CSI information nor HARQ-ACK information, if the determining circuitry determines the priority of a PUCCH carrying HARQ-ACK information is higher than the priority of a PUSCH carrying neither CSI information nor HARQ-ACK information.

In some embodiment, the processing circuitry 203 is adapted to discard the PUCCH carrying any information; or multiplex the CSI information carried by the PUCCH to the PUSCH carrying the HARQ-ACK information, if the determining circuitry determines the priority of a PUSCH carrying HARQ-ACK information is higher than the priority of a PUCCH carrying any information.

In some embodiment, the determining circuitry 202 is adapted to perform at least one of the following: determining a priority of a PUCCH carrying HARQ-ACK information is higher than a priority of a PUCCH carrying CSI information but not carrying HARQ-ACK information; and determining a priority of a PUCCH carrying CSI information and HARQ-ACK information is higher than a priority of a PUCCH carrying HARQ-ACK information only.

In some embodiment, the processing circuitry 203 is adapted to discard the PUCCH carrying the CSI information but not carrying the HARQ-ACK information; or multiplex the CSI information carried by the PUCCH carrying the CSI information but not the HARQ-ACK information to the PUCCH carrying the HARQ-ACK information, if the determining circuitry determines the priority of a PUCCH carrying HARQ-ACK information is higher than the priority of a PUCCH carrying CSI information but not carrying HARQ-ACK information.

In some embodiment, the processing circuitry 203 is adapted to discard the PUCCH carrying the HARQ-ACK information only, if the determining circuitry determines the priority of a PUCCH carrying CSI information and HARQ-ACK information is higher than the priority of a PUCCH carrying HARQ-ACK information only.

In some embodiment, the determining circuitry 202 is adapted to determine a priority corresponding to each physical channel in the target information, according to resource types corresponding to the physical channel.

In some embodiment, the determining circuitry 202 is adapted to determine a priority of a public PUCCH is higher than a priority of a non-public PUCCH.

In some embodiment, the processing circuitry 203 is adapted to discard the non-public PUCCH; or multiplex the information carried by the non-public PUCCH to the public PUCCH, if the determining circuitry determines the priority of a public PUCCH is higher than the priority of a non-public PUCCH.

In some embodiment, the determining circuitry 202 is adapted to determining the priority corresponding to each physical channel in the target information, according to cell indexes corresponding to physical channels.

In some embodiment, the determining circuitry 202 is adapted to perform at least one of the following: determining a priority of a public PUCCH with a minimum cell index is higher than a priority of a public PUCCH with a high cell index; and determining a priority of a non-public PUCCH with a minimum cell index is higher than a priority of a non-public PUCCH with a high cell index.

In some embodiment, the processing circuitry 203 is adapted to discard the public PUCCH with the high cell index; or multiplex the information carried by the public PUCCH with the high cell index to the public PUCCH with the minimum cell index, on the basis that the determining circuitry determines the priority of a public PUCCH with the minimum cell index is higher than the priority of a public PUCCH with the high cell index.

In some embodiment, the processing circuitry 203 is adapted to discard the non-public PUCCH with the high cell index; or multiplex the information carried by the non-public PUCCH with the high cell index to the non-public PUCCH with the minimum cell index, if the determining circuitry determines the priority of a non-public PUCCH with the minimum cell index is higher than the priority of a non-public PUCCH with the high cell index.

In an embodiment of the present disclosure, a computer-readable storage medium having computer instructions stored therein is provided, the computer-readable storage medium is a non-volatile storage medium or a non-transitory storage medium, wherein once the computer instructions are executed, the above method is performed.

In an embodiment of the present disclosure, a user terminal comprising a memory and a processor is provided, the memory has computer instructions stored therein, and the above method is performed, on the basis that the processor executes the computer instructions.

Those skilled in the art can understand that all or part of the various methods of the above-mentioned embodiments can be accomplished by a program instructing relevant hardware. The program can be stored in a computer-readable storage medium, and the storage medium may include: ROM, RAM, magnetic disk or CD, etc.

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A method for sending information, comprising:
    determining whether physical channels in target information exist channel collision, in response to detecting an instruction for sending target information;
    determining a priority corresponding to each physical channel in the target information, in response to existing channel collision in the target information;
    processing the target information based on the priority of each physical channel in the target information, wherein said processing the target information comprises: multiplexing information carried by a physical channel with a lower priority in the target information to a physical channel with a higher priority in the target information; or, discarding the information carried by a physical channel with a low priority in the target information; and
    sending processed target information;
    wherein said determining the priority corresponding to each physical channel in the target information comprises:
        determining the priority corresponding to each physical channel in the target information based on channel types and information carried by the physical channels;
    wherein said determining the priority corresponding to each physical channel in the target information based on the channel types and information carried by the physical channels comprises at least one of the following:
        determining a priority of a PUCCH carrying HARQ-ACK information is higher than a priority of a PUSCH carrying CSI information but not carrying HARQ-ACK information;
        determining a priority of a PUCCH carrying HARQ-ACK information is higher than a priority of a PUSCH carrying neither CSI information nor HARQ-ACK information; and determining a priority of a PUSCH carrying HARQ-ACK information is higher than a priority of a PUCCH carrying arbitrary information.

2. The method according to claim 1, wherein said determining whether physical channels in the target information exist channel collision comprises:

determining the physical channels in the target information exist channel collision, in response to detecting at least two physical channels overlap on a same symbol in the target information.

3. The method according to claim 1, wherein the CSI information carried by the PUSCH comprises at least one of the following: periodic CSI information, semi-persistent CSI information, and a non-periodic CSI report.

4. The method according to claim 1, wherein, in response to determining the priority of the PUCCH carrying HARQ-ACK information is higher than the priority of the PUSCH carrying CSI information but not carrying HARQ-ACK information, said processing the target information comprises:

multiplexing the CSI information carried by the PUSCH to the PUCCH carrying the HARQ-ACK information; or discarding the PUSCH carrying CSI information but not carrying HARQ-ACK information.

5. The method according to claim 1, wherein, in response to determining the priority of the PUCCH carrying HARQ-ACK information is higher than the priority of the PUSCH carrying neither CSI information nor HARQ-ACK information, said processing the target information comprises:

discarding the PUSCH carrying neither CSI information nor HARQ-ACK information.

6. The method according to claim 1, wherein, in response to determining the priority of the PUSCH carrying HARQ-ACK information is higher than the priority of the PUCCH carrying arbitrary information, said processing the target information comprises:

discarding the PUCCH carrying arbitrary information; or
multiplexing the CSI information carried by the PUCCH to the PUSCH carrying the HARQ-ACK information.

7. The method according to claim 1, wherein said determining the priority corresponding to each physical channel in the target information according to channel type and information carried by physical channel comprises at least one of the following:

determining a priority of a PUCCH carrying HARQ-ACK information is higher than a priority of a PUCCH carrying CSI information but not carrying HARQ-ACK information; and determining a priority of a PUCCH carrying CSI information and HARQ-ACK information is higher than a priority of a PUCCH carrying HARQ-ACK information only.

8. The method according to claim 7, wherein, in response to determining the priority of the PUCCH carrying HARQ-ACK information is higher than the priority of the PUCCH carrying CSI information but not carrying HARQ-ACK information, said processing the target information comprises:

discarding the PUCCH carrying the CSI information but not carrying the HARQ-ACK information; or
multiplexing the CSI information carried by the PUCCH carrying the CSI information but not carrying the HARQ-ACK information to the PUCCH carrying the HARQ-ACK information.

9. The method according to claim 7, wherein, in response to determining the priority of a PUCCH carrying CSI information and HARQ-ACK information is higher than the priority of a PUCCH carrying HARQ-ACK information only, said processing the target information comprises:

discarding the PUCCH carrying the HARQ-ACK information only.

10. The method according to claim 1, wherein said determining the priority corresponding to each physical channel in the target information comprises:

determining the priority corresponding to each physical channel in the target information according to resource types corresponding to the physical channels.

11. The method according to claim 10, wherein said determining the priority corresponding to each physical channel in the target information according to resource types corresponding to the physical channels comprises:

determining a priority of a public PUCCH is higher than a priority of a non-public PUCCH.

12. The method according to claim 11, wherein in response to determining the priority of the public PUCCH is higher than the priority of the non-public PUCCH, said processing the target information comprises:

discarding the non-public PUCCH; or
multiplexing the information carried by the non-public PUCCH to the public PUCCH.

13. The method according to claim 1, wherein said determining the priority corresponding to each physical channel in the target information comprises:

determining the priority corresponding to each physical channel in the target information according to cell indexes corresponding to the physical channels.

14. The method according to claim 13, wherein said determining the priority corresponding to each physical channel in the target information according to the cell indexes corresponding to the physical channels comprises at least one of the following:

determining a priority of a public PUCCH with a minimum cell index is higher than a priority of a public PUCCH with a high cell index; and determining a priority of a non-public PUCCH with a minimum cell index is higher than a priority of a non-public PUCCH with a high cell index.

15. The method according to claim 14, wherein in response to determining the priority of the public PUCCH with the minimum cell index is higher than the priority of the public PUCCH with a high cell index, said processing the target information comprises:

discarding the public PUCCH with the high cell index; or
multiplexing the information carried by the public PUCCH with the high cell index to the public PUCCH with the minimum cell index.

16. The method according to claim 14, wherein in response to determining the priority of the non-public PUCCH with the minimum cell index is higher than the priority of the non-public PUCCH with the high cell index, said processing the target information comprises:

discarding the non-public PUCCH with the high cell index; or
multiplexing the information carried by the non-public PUCCH with the high cell index to the non-public PUCCH with the minimum cell index.

17. A non-transitory computer-readable storage medium storing one or more programs, the one or more programs comprising computer instructions, which, when executed by a processor, cause the processor to:

determine whether physical channels in target information exist channel collision, in response to detecting an instruction for sending target information;

determine a priority corresponding to each physical channel in the target information, in response to existing channel collision in the target information;

process the target information based on the priority of each physical channel in the target information, wherein said processing the target information comprises: multiplexing information carried by a physical channel with a lower priority in the target information to a physical channel with a higher priority in the target information; or, discarding the information carried by a physical channel with a low priority in the target information; and send processed target information;

wherein said determining the priority corresponding to each physical channel in the target information comprises:

determining the priority corresponding to each physical channel in the target information based on channel types and information carried by the physical channels;

wherein said determining the priority corresponding to each physical channel in the target information based on the channel types and information carried by the physical channels comprises at least one of the following:

determining a priority of a PUCCH carrying HARQ-ACK information is higher than a priority of a PUSCH carrying CSI information but not carrying HARQ-ACK information;

determining a priority of a PUCCH carrying HARQ-ACK information is higher than a priority of a PUSCH carrying neither CSI information nor HARQ-ACK information; and determining a priority of a PUSCH carrying HARQ-ACK information is higher than a priority of a PUCCH carrying arbitrary information.

18. A user terminal comprising a memory and a processor, wherein the memory has computer instructions stored therein, when the processor executes the computer instructions, cause the processor to:

determine whether physical channels in target information exist channel collision, in response to detecting an instruction for sending target information;

determine a priority corresponding to each physical channel in the target information, in response to existing channel collision in the target information;

process the target information based on the priority of each physical channel in the target information, wherein said processing the target information comprises: multiplexing information carried by a physical channel with a lower priority in the target information to a physical channel with a higher priority in the target information; or, discarding the information carried by a physical channel with a low priority in the target information; and send processed target information;

wherein said determining the priority corresponding to each physical channel in the target information comprises:

determining the priority corresponding to each physical channel in the target information based on channel types and information carried by the physical channels;

wherein said determining the priority corresponding to each physical channel in the target information based on the channel types and information carried by the physical channels comprises at least one of the following:

determining a priority of a PUCCH carrying HARQ-ACK information is higher than a priority of a PUSCH carrying CSI information but not carrying HARQ-ACK information;

determining a priority of a PUCCH carrying HARQ-ACK information is higher than a priority of a PUSCH carrying neither CSI information nor HARQ-ACK information; and determining a priority of a PUSCH carrying HARQ-ACK information is higher than a priority of a PUCCH carrying arbitrary information.

* * * * *